(12) United States Patent
Epars et al.

(10) Patent No.: US 9,474,407 B2
(45) Date of Patent: Oct. 25, 2016

(54) FILTER CAP FOR FILTERING AND DISPENSING A NUTRITIONAL COMPOSITION

(71) Applicant: NESTEC S.A., Vevey (CH)

(72) Inventors: Yann Epars, Penthalaz (CH); Alain Meier, Caneggio (CH)

(73) Assignee: Nestec S.A., Vevey (CH)

( * ) Notice: Subject to any disclaimer, the term of this patent is extended or adjusted under 35 U.S.C. 154(b) by 350 days.

(21) Appl. No.: 14/351,439

(22) PCT Filed: Oct. 10, 2012

(86) PCT No.: PCT/EP2012/070005
§ 371 (c)(1),
(2) Date: Apr. 11, 2014

(87) PCT Pub. No.: WO2013/057015
PCT Pub. Date: Apr. 25, 2013

(65) Prior Publication Data
US 2014/0251147 A1    Sep. 11, 2014

(30) Foreign Application Priority Data
Oct. 17, 2011  (EP) .................................... 11185427

(51) Int. Cl.
*A47J 31/00*    (2006.01)
*A47J 31/44*    (2006.01)
(Continued)

(52) U.S. Cl.
CPC ............. *A47J 31/446* (2013.01); *A47J 31/005* (2013.01); *A47J 31/40* (2013.01); *A47J 31/605* (2013.01);
(Continued)

(58) Field of Classification Search
CPC .............. A47J 31/005; B05C 11/1042; C02F 2201/006; C02F 1/003
USPC ........ 99/323.3, 323, 317, 307; 210/244, 282, 210/455, 473; 222/146.5
See application file for complete search history.

(56) References Cited

U.S. PATENT DOCUMENTS 2,997,940 A * 8/1961 Pecoraro ............... A47J 31/005
99/315
4,452,130 A * 6/1984 Klein .................... A47J 31/005
99/307

(Continued)

FOREIGN PATENT DOCUMENTS

WO    2008106554    9/2008
WO    2010128051    11/2010

OTHER PUBLICATIONS

International Search Report corresponding to related International Patent Application No. PCT/EP2012/070005 mailed Nov. 6, 2012.
(Continued)

*Primary Examiner* — Reginald L Alexander
(74) *Attorney, Agent, or Firm* — K&L Gates LLP

(57) ABSTRACT

The invention relates to a filter cap (1) for filtering liquid and dispensing an aqueous nutritional composition to a human, the filter cap (1) comprising a liquid inlet means (6) designed to be supplied with liquid from external liquid dispensing means (20), an adaptor (2) for connecting the filter cap (1) to the liquid dispensing means (20), connection means (2) designed for selectively connecting an opening (10) of the filter cap (1) to a container (3) designed to hold a powdered or concentrated liquid nutritional formula base (5) for the preparation of the nutritional composition (5a) upon hydration with the supplied liquid, and a filter assembly (7) in the flow path of the liquid from the inlet means (6) to the opening (10), the filter assembly (7) being configured to remove contaminants from liquid fed into the container through the inlet means (6).

13 Claims, 8 Drawing Sheets

(51) Int. Cl.
   *C02F 1/00* (2006.01)
   *A47J 31/40* (2006.01)
   *A47J 31/60* (2006.01)
   *B01D 61/18* (2006.01)
   *B01D 35/02* (2006.01)
   *A47J 31/36* (2006.01)
   *A61J 9/00* (2006.01)

(52) U.S. Cl.
   CPC ............... *B01D 35/02* (2013.01); *B01D 61/18* (2013.01); *C02F 1/003* (2013.01); *A47J 31/36* (2013.01); *A61J 9/00* (2013.01); *B01D 2313/20* (2013.01); *B01D 2313/21* (2013.01); *C02F 2201/006* (2013.01)

(56) References Cited

U.S. PATENT DOCUMENTS

| | | | |
|---|---|---|---|
| 4,877,521 A * | 10/1989 | Petrucci | ............... B01D 24/105 210/171 |
| 6,733,669 B1 | 5/2004 | Crick | |
| 2006/0157463 A1 | 7/2006 | Wiele et al. | |
| 2011/0233119 A1 | 9/2011 | Nelson | |

OTHER PUBLICATIONS

International Written Opinion corresponding to related International Patent Application No. PCT/EP2012/070005 mailed Nov. 6, 2012.

* cited by examiner

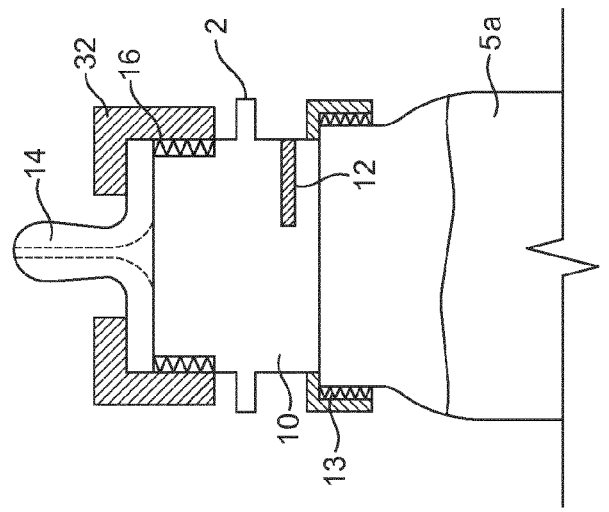
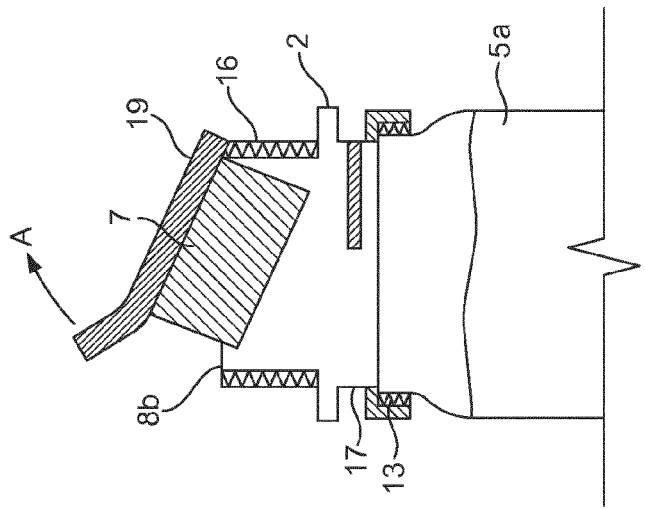
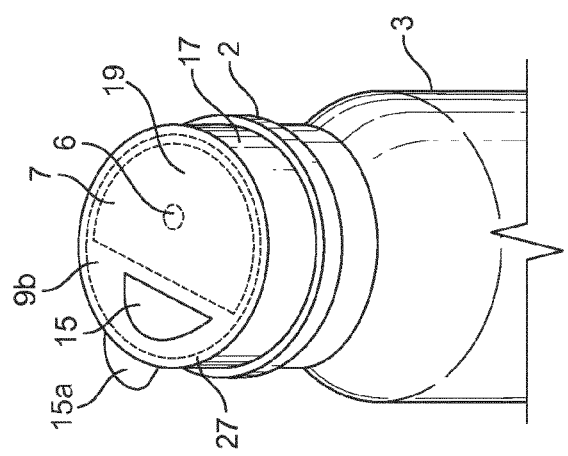

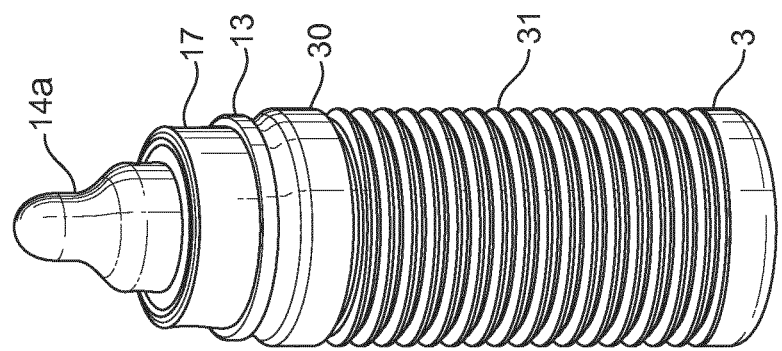
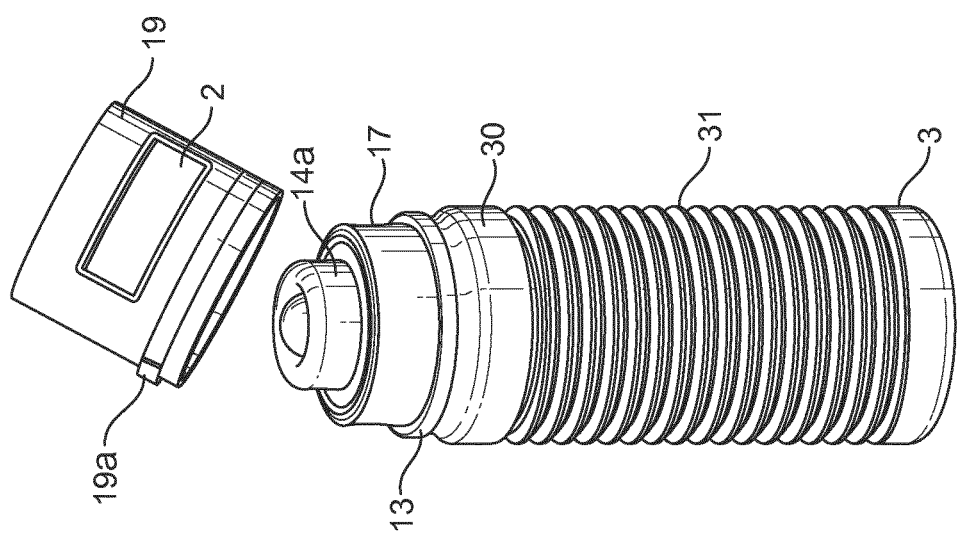
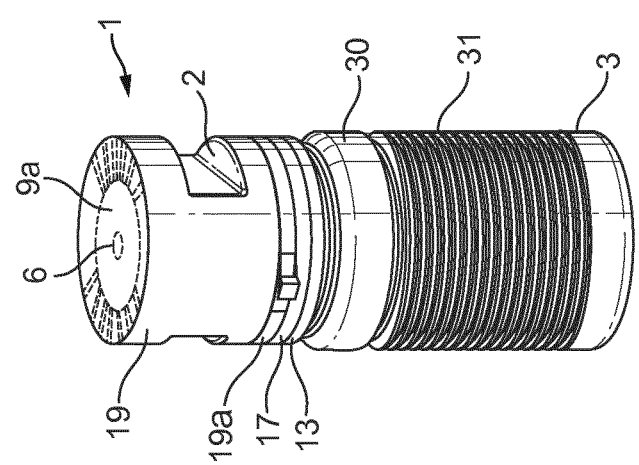
FIG. 7c
FIG. 7b
FIG. 7a

FILTER CAP FOR FILTERING AND DISPENSING A NUTRITIONAL COMPOSITION

CROSS REFERENCE TO RELATED APPLICATIONS

The present application is a National Stage of International Application No. PCT/EP2012/070005, filed on Oct. 10, 2012, which claims priority to European Patent Application No. 11185427.9, filed Oct. 17, 2011, the entire contents of which are being incorporated herein by reference.

FIELD OF THE INVENTION

The present invention relates to a filter cap for the hygienic preparation of a nutritional composition, especially an infant/toddler formula. More particularly, the invention relates to a filter cap for being connected to a container containing a predefined amount of nutritional formula base for the preparation of a ready-to-drink aqueous nutritional formula composition in combination with supplied liquid.

BACKGROUND OF THE INVENTION

Nutritional formulas or compositions can be, for instance, infant formulas or also nutritional liquids for toddlers, invalids, elderly people, humans having nutritional deficiencies and/or having a deficient immune system or athletes.

In the field of nutritional compositions, single-serving solutions are known which enable to provide a predefined amount of comestible product to a consumer.

WO2009/083495 for example relates to a packaging for a consumable articles such as a comestible product or medicine, that comprises a container including an amount of the consumable article necessary for a single use, wherein the container is provided at one end thereof with an opening being surrounded by a rigid skirt adapted for being connected to a liquid container such as a bottle. Opening means of the container enable to mix the consumable article of the container with liquid provided within the bottle.

A more convenient preparation of a nutritional composition is enabled by a preparation device in which a single-serving of a preferably powdered composition being provided within a capsule or cartridge is dissolved by means of injection with filtered respectively sanitized liquid such as water. Thereby, any undesired contaminants should be removed from the liquid before the liquid is mixed with the ingredients. For this purpose, such a device preferably comprises filter means for filtering respectively sanitizing the water.

In recent development, capsules with integrated antimicrobial filter have been introduced into the market in order to ensure the provision of filtered respectively sanitized liquid to the capsule for the preparation of the nutritional composition.

US2011233119A1 relates to a sports bottle device with filter isolated from filtered fluid and may have particular application for baby formulas. The device comprises a lower filtering bottle section for connecting to an upper bottle delivery section. However, such lower filtering bottle section is not formed as a cap for connecting to a feeding container. It is furthermore not adapted to be connected to external liquid dispensing means for being supplied with liquid by these means. In particular, the lower filtering section must be disconnected from the upper bottle section before being fed with liquid such as from a water supplying tap. Furthermore, the filter assembly is not arranged in the lower filtering section to remove contaminants from liquid supplied into the feeding container through the inlet means by the external liquid dispensing means. The filter assembly is configured to filter liquid when the liquid is transferred from the lower bottle section to the upper bottle section. As a result, the device lacks hygiene as the upper bottle section may be contaminated by the lower bottle section when the lower bottle section is connected to the upper bottle section after refilling of the lower bottle section. Furthermore, the device is not adapted to provide a good powder dissolution in liquid since the liquid is transferred from the lower bottle section to the upper bottle section by effect of pumping with the bellows provided in the lower bottle section thereby conferring potentially low energy to the liquid flow.

WO2009/092629A1 for example relates to a capsule for use in a beverage production device, the capsule containing ingredients for producing a nutritional liquid when a liquid is fed into the capsule at an inlet face thereof, the capsule being provided with an anti-microbial filter.

WO2010/128051A1 relates to a capsule for preparing a nutritional product including a filter adapted for removing contaminants wherein the filter is formed of a filter unit that comprises a filter membrane and an outlet wall for supporting the filter membrane; the outlet wall comprising at least one liquid outlet communicating with the container.

A drawback with the known capsule-based preparation devices comes from the fact that in addition to the capsules containing the infant formula base, a serving vessel for the instant formula such as a baby bottle is required. Accordingly, the required space for storage and transport of the components necessary for the preparation of the instant formula is relatively large.

Another drawback comes from the fact that the release of a reconstituted liquid composition from a capsule requires a complete dissolution or dispersion of the ingredients/formula with the diluents (e.g. ambient or warm water) to ensure a complete release of the resulting composition from the capsule to the serving bottle.

Another drawback remains the requirement for cleaning and sterilizing serving vessel that is to be carried out after each and/or before each preparation of the nutritional composition.

Therefore, a solution is sought-after which overcomes these problems.

In particular, it is desirable to enable a facilitated storage and transport of the components of the beverage preparation system. It is also desirable to reduce the number of these components and their volume in order to reduce the environmental impact of the packaging.

It is also an object to remove the need for cleaning respectively sterilization of any major component.

The present invention seeks to address the above-described problems. The invention also aims at other objects and particularly the solution of other problems as will appear in the rest of the present description.

OBJECT AND SUMMARY OF THE INVENTION

In a first aspect, the present invention relates to a filter cap for filtering liquid, the filter cap comprising a liquid inlet means designed to be supplied with liquid from external liquid dispensing means, an adaptor for connecting the filter cap to the liquid dispensing means, connection means designed for selectively connecting an opening of the filter cap to a container designed to hold a powdered or concentrated liquid nutritional formula base for the preparation of the nutritional composition upon hydration with the supplied liquid, and a filter assembly in the flow path of the liquid from the inlet means to the opening, the filter assembly being configured to remove contaminants from liquid supplied into the container through the inlet means.

In particular, the liquid inlet means is arranged to supply liquid from an inlet face of the cap to the opening such that, when connected to the feeding container, liquid is fed from the external liquid dispensing means into the container. Therefore, the dissolution of the powdered or concentrated liquid nutritional formula base can be more effectively obtained since the energy provided by the flow can be obtained from the external liquid dispensing means and the liquid can be supplied in the form of a jet through the inlet opening into the container. Furthermore, there is no need for removing the cap from the container during liquid supply and dissolution of the nutritional formula is obtained as liquid is fed.

According to the present invention, a filter cap for filtering liquid provided to an interior of a container holding a concentrated liquid nutritional formula base is provided, whereby the filter cap may be independently provided and connected to any given container holding an amount of the formula base or may be assembled to a given container such as at a manufacturing site.

In the following application, the simplified terms "formula base" means a powdered or concentrated liquid nutritional formula base specifically designed for infants, toddlers, humans having nutritional deficiencies and/or having a deficient immune system, invalids, elderly people, or athletes; such formula base requiring a liquid, such as water, for the preparation of a ready-to-drink nutritional composition.

In a preferred mode, the filter cap comprises a body portion having a first side to which the filter assembly is connected and a second side in fluid communication with the first side, on which the opening is arranged. On said second side, the connection means of the filter cap are preferably integrally formed with the body portion. The connection means are preferably arranged annular to the opening. Thereby, the connection means may be a protruding connection skirt which is designed to match a standard screw threat of a bottle such as e.g. a baby bottle.

In a preferred embodiment, the filter cap further comprises liquid outlet means that are designed to release gas and/or liquid from the container connected to the filter cap to the exterior of the filter cap.

The liquid outlet means may for example be constituted by an aperture or opening in the body portion of the filter cap and connected at least to the opening provided on the second side of the filter cap. Thereby, the liquid outlet means are preferably extending from the second side to the first side of the body portion of the filter cap.

In an alternative embodiment, the outlet means are designed to provide an additional flow path for liquid from the container connected to the filter cap respectively from the opening on the second side of the body portion in fluid connection with the container to the exterior of the filter cap.

Thereby, said additional flow path is preferably different from the flow path from the inlet means to the opening.

The additional flow path is preferably arranged in series or in parallel to the flow path from the inlet means to the opening.

The filter cap preferably further comprises a gas-liquid equilibrium means to allow gas, e.g., air or a protective gas contained in the container connected to the filter cap, to leave the container as liquid is fed thereto through the filter means. In a mode, the gas-liquid equilibrium means may be a one-way valve which is permeable to gas but impermeable to liquid, thereby allowing the exit of gas from the interior of the container when water is fed thereto. Such gas-liquid equilibrium means may, for example, be constituted by a venting membrane connected or integrally formed with the body portion of the filter cap to equalize the pressure within the container when liquid is provided to the container by means of the filter cap.

The gas-liquid equilibrium means may as well be arranged in the flow path from the inlet to the opening of the body portion or the additional flow path from the opening to the outlet means.

In a preferred embodiment, the liquid inlet means are designed to be connected by an external liquid probe of the liquid dispensing means. Accordingly, provided liquid such as preheated water can be directly fed to the inlet means and thus to the interior of a container connected to the filter cap in order to prepare the nutritional composition.

In a preferred mode, the filter assembly according to the present invention is designed to be selectively removed from the filter cap.

Thereby, the filter assembly is preferably removably connected to the body portion of the filter cap. In particular, the filter cap may comprise a disposable portion fixedly connected to at least the filter assembly and removably connected to the body portion.

The filter assembly comprises a filtering membrane and at least one rigid supporting wall downstream of the membrane. Preferably, the membrane is placed between a rigid upper (i.e. upstream) and lower (i.e. downstream) supporting wall. The micro-porous membrane is arranged to form a barrier to contaminants, in particular, microorganisms such as bacteria. For antimicrobial purpose, the filter membrane has preferably a pore size of less than 0.4 microns, most preferably of less than 0.2 microns. It may have a thickness of less than 500 microns, preferably between 10 and 300 microns. The material of the membrane can be chosen from the list consisting of PES (polyethersulfone), cellulose acetate, cellulose nitrate, polyamide and combinations thereof. Thereby, the outer wall of the filter assembly preferably comprises a liquid inlet and the inner wall comprises a liquid outlet to direct at least one liquid jet into the container. The liquid inlet of the filter assembly is preferably designed to be connected to an outlet probe of the liquid dispensing means in order to provide liquid to the filter assembly and thus, to the interior of the container.

The filter assembly is preferably designed as a handleable rigid unit to withstand the pressure exerted thereon by liquid fed in the container and also to resist to manual mechanical constraints such as squeezing or piercing of the membrane by the outlet probe of the dispensing device.

The filter assembly according to the present invention may be designed as the filter unit described e.g. in WO 2010/128051.

The filter cap preferably further comprises a resealable portion arranged in the flow path of the liquid from the inlet means to the opening. Thereby, the resealable portion is preferably designed to close-off the flow path between the inlet means and the opening after provision of liquid by the external liquid dispensing means.

Hence, during feeding of the prepared nutritional formula from the container to the outlet means of the filter cap, liquid is prevented from bypassing the outlet means of the filter cap and thus, the serving of the complete nutritional formula to the human is ensured.

According to a preferred mode, the resealable portion is designed to interact with the disposable portion of the filter cap to close-off the flow path from the opening to the liquid inlet upon removal of the disposable portion. Thereby, the resealable portion may be designed to elastically and/or plastically deform in order to close-off said flow path.

In another preferred embodiment of the present invention, the filter cap further comprises feeding means such as a teat or nipple assembly.

Thereby, the teat assembly may be provided as an additional part to the filter cap which may be connected to the filter cap by means of additional connection means of the filter cap. Thereby, the teat assembly may be designed to match with a correspondingly shaped connection means. The connection means may also be designed to fit a standard teat available on the market.

Accordingly, the user may provide an external teat assembly to the filter cap in order to facilitate feeding of the nutritional composition from the container to the consumer.

Thereby, the connection means are preferably arranged in the vicinity of the outlet means of the filter cap and designed to enable a stable connection of the filter cap with the nipple assembly.

Alternatively, the filter cap may comprise an integrally formed feeding means respectively a teat assembly which is arranged in fluid communication to the opening of the filter cap. The teat assembly may be connected to the outlet means or may constitute the outlet means of the filter cap.

Thereby, the integrally formed teat assembly is preferably connected to the body portion of the filter cap. The integrally formed teat assembly may as well be designed to be selectively removable from the body portion of the filter cap.

In a preferred embodiment of the invention, the filter cap further comprises sealing means such as a sealing membrane or sealing cap that is arranged to cover the first inlet side of the filter cap, and in particular the liquid inlet in order to prevent ingress of contaminants before use. Preferably, when the filled cap is a separate part of the container, a sealing membrane or cap is also arranged to cover the second outlet side.

In a preferred embodiment, the outer wall of the filter assembly is preferably covered by a puncturable membrane made of polymer and/or aluminium to enable liquid to be supplied to the filter assembly by means of a liquid outlet probe of the liquid dispensing means.

The sealing means may as well at least partially constitute the disposable portion of the filter cap which is removably connected to the body portion in order to remove the filter assembly from the body portion of the filter cap. Thereby, at least a portion of the sealing means may be fixedly connected to the filter assembly and designed to allow a selective removal of the filter assembly from the body portion of the filter cap.

Therefore, the sealing means according to the present invention preferably comprise a first sealing membrane and a second sealing membrane with different respective sealing strength. Thereby, the second sealing membrane is at least partially fixedly connected to the filter assembly. Preferably, the sealing connection of said second membrane and the filter assembly is stronger than the sealing connection between the second membrane and a portion of the filter cap.

The filter cap preferably comprises a reinforcing structure for supporting the filter membrane within the body portion of the filter cap. Thereby the reinforcing structure may be a recession or protrusion formed within the filter cap. Moreover, the reinforcing structure may be a T-shaped, an X-shaped or a Y-shaped support which is preferably provided in the flow path from the filter membrane to the opening of the filter cap.

The reinforcing structure is preferably designed to support the filter membrane against pressure and/or force supplied from the exterior thereon. Moreover, the reinforcing structure is preferably positioned to abut the filter membrane and to prevent a displacement of the filter membrane towards the opening respectively towards a container connected to the filter cap. Such displacement could indeed damage the filter membrane, e.g., causing its breakage, and consequently would reduce the safety level of the device.

The adaptor of the filter cap is preferably designed to match with an additionally provided cap connector e.g. for connecting the filter cap to a liquid dispensing means. The adaptor can be one or more portions of wall protruding transversally or being recessed from an outer surface of the filter cap.

In another aspect, the present invention relates to a beverage production system, comprising a filter cap according to the present invention, a container or bottle designed to hold a powdered or concentrated liquid nutritional formula base for the preparation of the nutritional composition upon hydration with the supplied liquid, and a liquid dispensing means having: connection means for connecting to at least a portion of the filter cap and outlet means for supplying liquid to the filter cap.

Moreover, system according to the present invention preferably also comprises an additionally provided cap connector for connecting the inlet means of the filter cap to the outlet means of the liquid dispensing means.

BRIEF DESCRIPTION OF THE FIGURES

FIG. 5a is a perspective top view of the embodiment according to FIG. 1a in which an outer membrane is removed from the filter cap.

FIG. 5b is a sectional side view of the embodiment according to FIG. 5a, wherein the filter assembly is removed.

FIG. 5c is sectional side view of the embodiment according to FIGS. 5a and 5b, wherein an additionally provided feeding assembly is attached onto the filter cap.

FIG. 7a is a perspective side view of an assembly of a filter and bottle of the embodiment according to FIG. 6b.

FIG. 7b is a perspective side view of the embodiment according to FIG. 7a, wherein the filter assembly has been removed from the base portion of the filter cap.

FIG. 7c is a perspective side view of the embodiment according to FIGS. 6a and 6b, wherein the feeding assembly is in an extended ready-to-feed position.

FIG. 8b is a perspective side view of the embodiment according to FIG. 8a.

DETAILED DESCRIPTION OF EMBODIMENTS

Figure 1A:
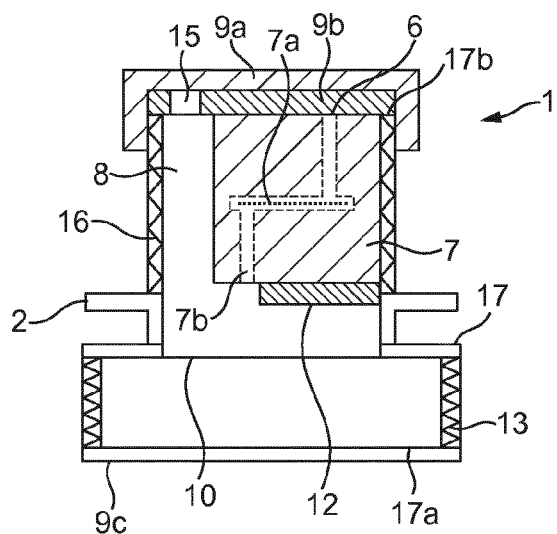
FIG. 1a is a sectional side view of an embodiment of the filter cap according to the invention.

FIG. 1 shows a sectional side view of a preferred embodiment of the filter cap 1 according to the present invention.

The filter cap 1 comprises a tubular body portion 17 that is preferably integrally formed with connection means 13 designed to connect the filter cap 1 to a feeding container or bottle 3 (see FIG. 1 b).

The body portion 17 preferably comprises an opening 10 which is designed to contact to an inlet respectively outlet aperture 3a of the feeding container 3 in order to establish a fluid connection between the container 3 and the body portion 17.

The opening 10 preferably extends from a first end 17a of the body portion 17 to a second end 17b thereof, which is preferably arranged opposite to the first end 17a.

The filter cap 1 further comprises a filter assembly 7 that is removably connected to the body portion 17 of the filter cap 1. Thereby, the filter assembly 7 may be arranged within the opening 10 of the body portion 17 as shown in FIG. 1a. The, the filter assembly 7 is arranged to at least partially close-off the opening 10.

The filter assembly 7 is preferably held within the opening 10 by means of provided reinforcement structure 12. The reinforcement structure 12 may be any structure integrally formed or provided within the filter cap 1. In particular, the reinforcement structure 12 may be a protrusion and/or a recession integrally formed within the body portion 17.

The filter cap 1 further comprises sealing means 9a,9b,9c which prevent the ingress of the contaminants into the filter cap 1 before use thereof.

Thereby, the sealing means comprise at least one sealing membrane and/or cap, preferably sealing membranes 9b, 9c and a sealing cap 9a which are arranged on a first and second sides 17a,17b of the filter cap 1 and which may be sealed to an outer surface of the filter cap 1. The outer sealing membranes 9b, 9c and cap 9a are preferably designed to be removable by a user before use of the filter cap 1. Instead of the outer sealing membranes and/or sealing cap the filter cap 1 may be provided in a sealing enclosure such as a removable sealing package.

The sealing means may also comprise an inner sealing membrane 9b that is at least partially fixedly connected to the filter assembly 7 of the filter cap 1. Thereby, the outer sealing means 9a provided on the first side 17b of the body portion 17 may as well be sealed to the inner sealing means 9b in a manner to enable a facilitated removal of the outer sealing means 9a by manual pulling force of a consumer.

Figure 3:
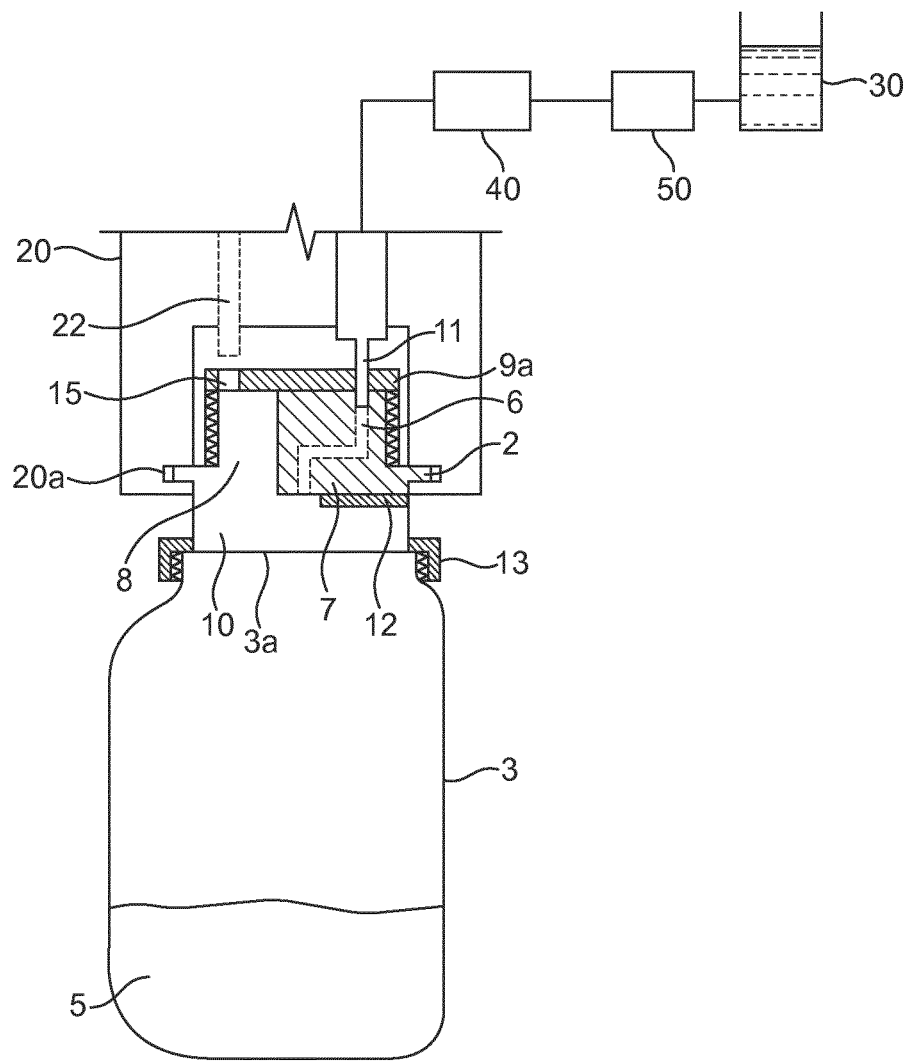
FIG. 3 is a sectional side view of an embodiment of the system according to the present invention, wherein the bottle is connected to the water dispensing means.

The filter assembly 7 is in connection or comprises a liquid inlet 6 suitable for being connected by a specifically designed liquid probe 11 of a dedicated liquid dispensing means 20 (see FIG. 3).

The filter assembly 7 preferably comprises a filter membrane 7a and a filter outlet 7b which connects the liquid inlet 6 to the opening 10 of the bottle 1. The filter membrane 7a is situated in the liquid flow path between the inlet 6 and the filter outlet 7b. The membrane is preferably a micro-porous membrane designed for removing any contaminants present in liquid provided to the filter assembly 7.

The liquid inlet 6 is preferably sealed by the inner sealing means respectively the inner sealing membrane 9b sealed to the filter assembly 7. The inlet 6 may however also be sealed by means of a piercable material respectively sealing means integrally formed with the filter assembly 7, such as e.g. plastic material designed to be pierced by on outlet probe 11 of the liquid dispensing means 20.

The filter cap 1 further comprises outlet means 8 which enable the ejection of liquid and/or air from a container 3 (see FIG. 1 b) connected to the filter cap 1 to the exterior of the filter cap 1.

The outlet means 8 may be constituted by at least a portion of the opening 10 formed in the body portion 17 of the filter cap 1.

According to the embodiment of FIGS. 1a and 1 b, the opening 10 in the body portion 17 is not fully covered respectively closed-off by means of the filter assembly 7 and thus, during the injection of the liquid to the interior of a connected container 3, air may be removed from the container 3. For this purpose, the inner sealing means respectively sealing membrane 9b preferably comprises a gas-liquid equilibrium means such as a venting opening 15 which allows the removal of internal gas from the container 3 as liquid is filled in the container through the liquid inlet and after the outer sealing means 9a have been removed from the filter cap 1.

As an alternative, the filter assembly 7 may comprise integrally formed gas-liquid equilibrium means (such as described later in conjunction with the mode of FIG. 2) such as for example a venting opening. Said integrally formed venting opening may be sealed by the provided sealing means 9a. Thereby, the venting opening may be opened by a user, e.g. by removing the sealing means 9a or by dedicated opening means provided at a liquid dispensing means 20.

Figure 4:
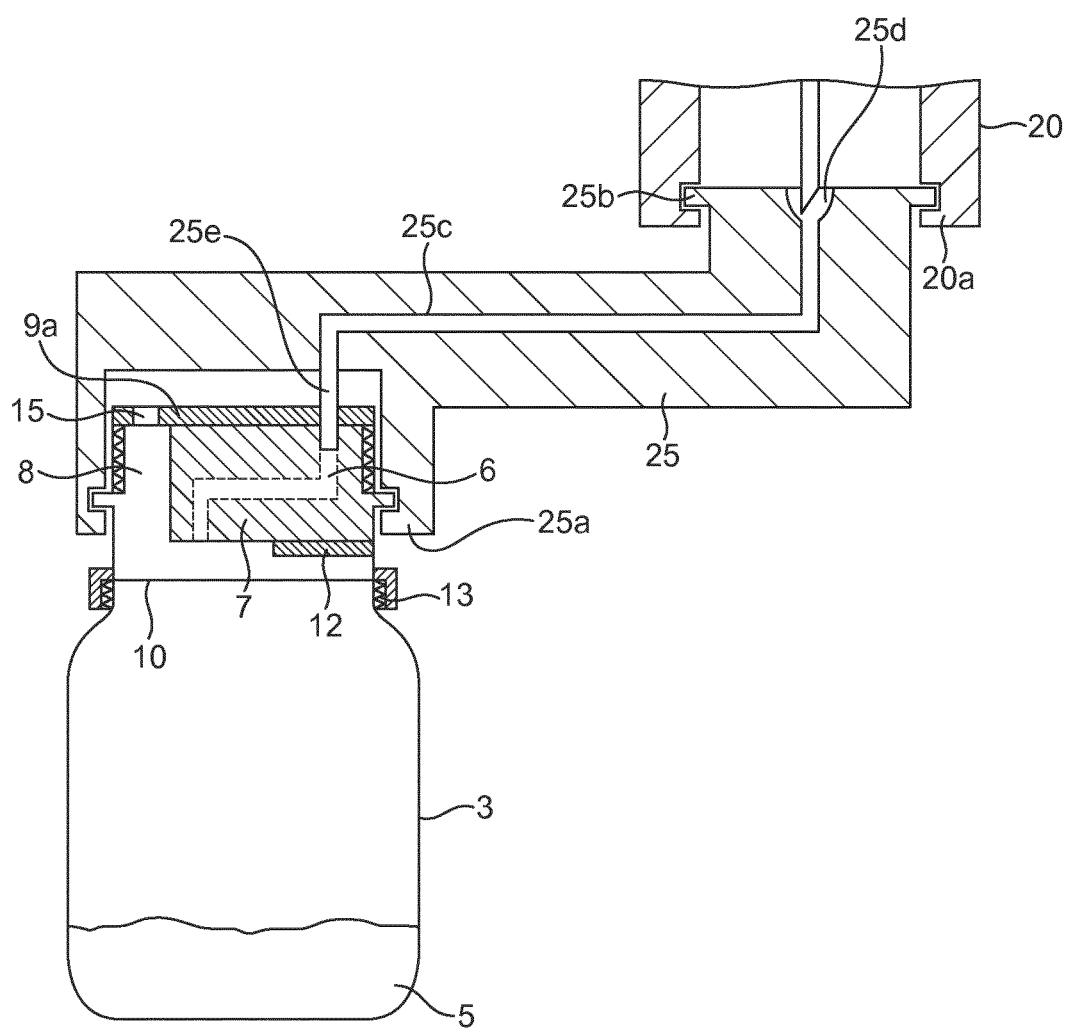
FIG. 4 is a sectional side view of a preferred embodiment of the system according to the present invention, wherein the filter cap is connected to the water dispensing means by means of a cap connector.

The filter cap 1 further comprises connection means such as an adaptor 2 which are designed to enable a connection of the filter cap 1 to a dedicated liquid dispensing means 20 or an additionally provided cap connector 25, 25a (as apparent in FIG. 4). The connection means 2 may be at least one protrusion and/or recession formed in the filter cap 1. For example, the connection may be a bayonet-type connection or a thread.

Figure 1B:
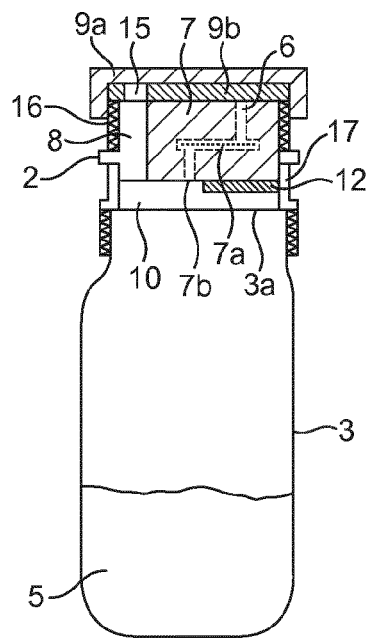
FIG. 1b is a sectional side view of the filter cap according to FIG. 1a, wherein a container or bottle has been connected to the filter cap.

FIG. 1b shows a sectional side view of the embodiment according to FIG. 1a, wherein the filter cap 1 is connected to a feeding container 3 such as a feeding bottle.

The container 3 has an opening 3a in fluid connection with the opening 10 of the filter cap 1 and encloses a predefined portion of powdered or concentrated nutritional formula base 5 that has been provided by a user before assembling the filter cap 1 onto the feeding container or bottle 3. Alternatively, the filter cap is assembled to a feeding container filled with a dose of powdered or concentrated nutritional formula base at a manufacturing site.

The connection means 13 for connecting the filter cap 1 with the container 3 is preferably a protruding skirt comprising an inner standard screw threat suitable for connecting to common feeding bottles such as standard baby bottles. The connection means 13 could as well be of special design to be assembled only to matching connection means of non-standard feeding bottles.

The connection means 13 may as well be adaptable such as e.g. an adaptable clamping means designed for being connected to different containers 3 respectively bottles of variable neck portions.

Figure 2:
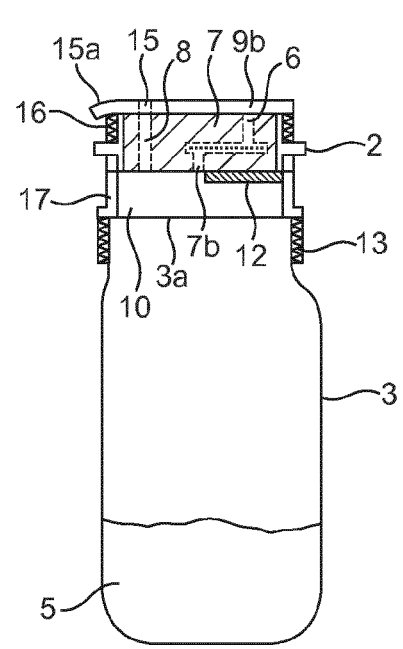
FIG. 2 is a sectional side view of another embodiment of the filter cap according to the invention, wherein a container or bottle has been connected to the filter cap.

FIG. 2 shows a sectional side view of another embodiment of the filter cap 1 according to the invention. Thereby, the filter assembly 7 fully covers the opening 10 provided in the body portion 17 of the filter cap 1.

The filter assembly 7 according to said embodiment comprises an integrally formed gas-liquid equilibrium means 8a, such as for example a vent or air outlet channel or a valve, in order to allow gas to exit the container 3 during filling of the container with liquid provided from water dispensing means 20 when connected to the liquid inlet 6. Therefore, the inner membrane 9b comprises a venting aperture 15 which connects the gas-liquid equilibrium means 8a of the filter assembly to the exterior of the filter cap 1. It is to be noted that FIG. 2 refers to a state of the filter cap 1, wherein the outer membrane or cap 9a has already been removed by the user. Thereby, the inner membrane 9b may comprise a protruding lip or tab 15a in order to facilitate removal of the inner membrane 9b from the filter cap 1. The inner membrane 9b is perforable by a probe of the water dispensing means through the liquid inlet 6.

FIG. 3 shows a schematic drawing of the dispensing system according to the present invention comprising liquid dispensing means 20 and a filter cap 1 with a feeding container 3 connected thereto. The liquid dispensing means 20 preferably comprise a water reservoir 30, a pump 40 and a heater 50 suitable for heating the liquid provided by means of the liquid supply in a continuous flow.

The liquid dispensing means 20 preferably further comprise connection means 20a designed for connecting the adaptor 2 of the filter cap 1.

Moreover, the liquid dispensing means 20 comprise an outlet probe 11 which is designed to connect to the inlet 6 of the filter assembly 7 of the bottle 1.

In addition, the liquid dispensing means 20 may further comprise opening means 22 which are designed to tear or perforate the sealing membrane 9a. Thereby, the opening means 22 may be arranged to open the membrane 9a in order to allow venting of the container 3 during liquid injection thereof. Moreover, the opening means 22 may be integrally formed with the outlet probe 11. The outlet probe 11 and/or the opening means 22 are preferably movable relative to the connection means 20a of the dispensing means 20. For example, the probe 11 and opening means 22 can be moved in a coordinated manner to provide each opening at the same time or sequentially.

After opening of the membrane 9a by means of the outlet probe 11 and/or the opening means 22, liquid may be injected into the filter cap 1 and thus, into container 3. Thereby, a user may control the amount of liquid provided into the container 3 e.g. by means of a dedicated control means (not shown) connected at least to the pump 40 of the water dispensing means 20. A dedicated control means suitable to provide a proper amount of water in the bottle may use a flow meter and a control unit as known per se.

FIG. 4 relates to another preferred embodiment according to the present invention, wherein the system further comprises a cap connector 25 which is designed to act as an interface between the water dispensing means 20 and the filter cap 1. Thereby, the cap connector 25 preferably comprises connecting means 25a for connecting to the adaptor 2 of the filter cap 1, as well as connecting means 25b being designed to connect the cap connection to the water dispensing means 20.

The cap connector 25 may comprise an integrally formed liquid path 25c connecting an inlet adapter 25d at an inlet portion of the cap connector to an outlet probe 25e at an outlet portion thereof. Thereby, the inlet adapter 25d is designed to be connected to the outlet probe 11. The outlet probe 25e is designed to be connected to the inlet means 6 of the filter cap 1.

FIG. 5a relates to the filter cap 1 being at least partially opened by removing the first membrane or cap 9a sealed to the outer portion of the second sealing membrane 9b and/or the body portion 17 of the filter cap 1. Thereby, an outlet aperture 15 or valve which is preferably provided within the membrane 9b is laid open.

The liquid inlet 6 is preferably still covered by the inner membrane 9b and is opened upon contact with the outlet probe 11 of the dispensing means 20.

After the injection of liquid into the container 3 by means of the outlet probe 11 being connected to the filter assembly 7, the filter assembly 7 may be removed from the filter cap 1 by tearing the second membrane 9b as shown in FIG. 5b (see arrow A). Thereby, the sealing between the second membrane 9b and an outer circumferential portion 27 of the body portion 17 is weaker than the sealing connection between the second sealing membrane 9b and the filter assembly 7.

By removing the filter assembly 7, a liquid outlet 8b of increased cross-sectional area is provided which enables to facilitate the removal of the complete liquid nutritional composition 5a from the container 3.

Before the withdrawal of the nutritional composition 5a, a feeding means such as a nipple or teat assembly 14 may be provided to the filter cap 1. As can be seen in FIG. 5c, the teat assembly 4 may be connected for example by means of a dedicated connection means such as a cap nut 32 which interacts with the provided screw thread 16 at the circumference of the body portion 17 or another connection means.

The teat assembly 14 may as well be specifically designed to match the screw thread respectively connection means 16 and/or an outer portion of the body portion 17.

Figure 6A:
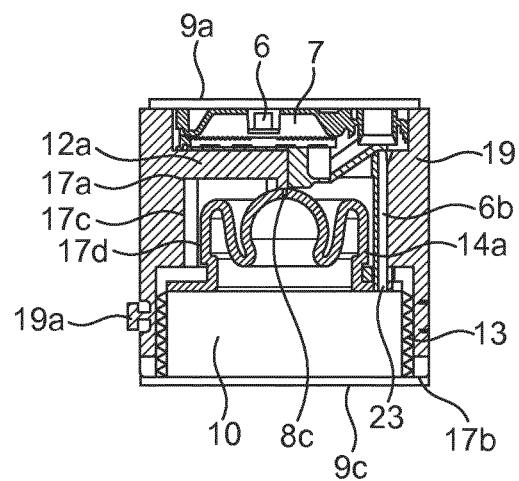
FIG. 6a is a sectional side view of another embodiment of the filter cap according to the invention, wherein the filter cap comprises an integrally formed feeding means.

FIG. 6a relates to another preferred embodiment of the filter cap 1 according to the invention, wherein the filter cap 1 comprises feeding means 14a.

The filter cap 1 further comprises a disposable cap portion 19 which is connected to the body portion 17 of the filter cap 1. Thereby, the disposable cap portion 19 forms preferably a sealing collar connected to an annular portion 17c of the body portion 17. The disposable portion 19 is preferably secured to the body portion 17, e.g. by means of a removable latch member 19a.

The filter assembly 7 is preferably fixedly connected to the disposable cap portion 19 which holds the filter assembly 7 in position above the feeding means 14a by means of integrally formed reinforcement structure 12a.

The feeding means 14a is preferably a nipple or teat assembly which is connected to an inner annular surface 17d of the body portion 17, thereby preferably fully closing-off the opening 10 extending from a first side 17a to a second side 17b of the body portion 17.

The integrally formed feeding means 14a are preferably in a compressed respectively retracted state when the disposable cap portion 19 is connected to the body portion 17. Thereby, the disposable cap portion 19 preferably at least partially covers the opening 10 on the first side 17a of the body portion 17 in order to hold the feeding means 14a in a retracted state as shown in FIG. 6a.

The feeding means 14a preferably constitute the outlet means of the filter cap 1 when the filter cap 1 is connected to a container or bottle 3. Thereby, the feeding means 14a comprise an outlet 8c providing an additional outlet flow path from the opening 10 to the exterior of the filter cap 1 when liquid, e.g., nutritional composition, is dispensed from a connected container 3.

The outlet 8c preferably serves as a venting means in order to enable gas present in the container to exit the container 3 during provision of liquid thereto by means of the filter cap 1.

The flow path from the inlet means 6 to the opening 10 which is used to fill the container 3 with liquid, in particular water, connected to the opening 10 is preferably arranged in parallel to the additional outlet flow path between the opening 10 and the outlet 8c which is used to deliver the liquid nutritional composition.

Thereby, the disposable cap portion 19 preferably comprises an integrally formed liquid channel 6b which is connected to the filter assembly 7 allowing flow communication between the inlet 6 and the opening 10 of the body portion 17 in order to constitute an inlet flow path for feeding liquid into the container 3.

The filter cap 1 further comprises a resealable means 23 of the liquid channel 6b.

The resealable means 23 is preferably formed by a tubular portion of the cap portion 19 holding open a resealable portion made of elastically deformable material comprising an aperture. In particular, the aperture of the resealable portion is held open by the tubular portion when the portion is inserted into the aperture and the aperture closes-off when the tubular portion is removed from the aperture such as when the cap portion 19 is removed from the body portion 17 of the cap. Thereby, the resealable portion 23 is preferably integrally formed with the feeding assembly respectively teat 14a connected to the body portion 17. The resealable portion may be formed on the border of the teat with the aperture traversing the border. The teat 14a can, for instance, be formed of moulded silicone, elastomer or resilient and soft plastic.

Figure 6B:
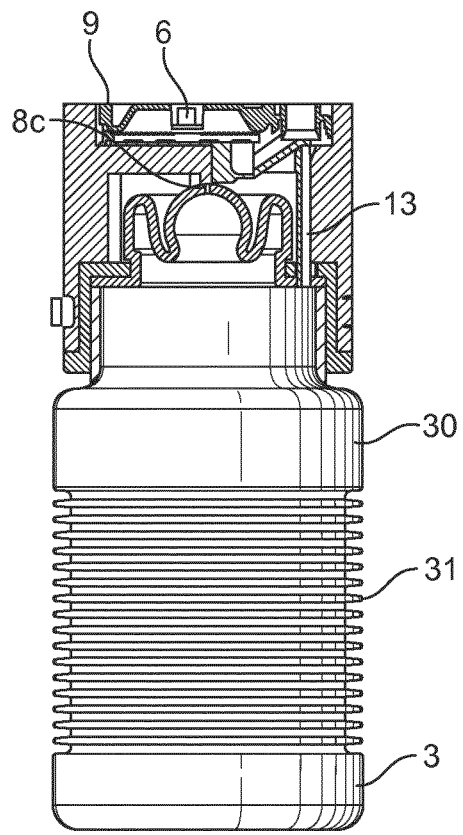
FIG. 6b is a sectional side view of the embodiment according to FIG. 6a, to wherein the filter cap is connected to a feeding container or bottle.

FIG. 6b shows the embodiment of the filter cap 1 according to FIG. 6a in a state connected to a container respectively bottle 3 by means of the connection means 13, wherein the bottle 3 is filled with a desired amount of nutritional formula base 5 and which may be designed expandable and/or retractable. Accordingly, the volume of the container 3 enclosed by an outer wall 30 of the bottle 3 is designed to be variable.

The bottle 3 may comprise an expandable and/or retractable portion 31 integrally formed with the outer wall 30. The expandable and/or retractable portion 31 may be a concertina-like structure having a plurality of recesses and/or protrusions arranged about the circumference of the container 3.

The bottle 3 may be stored in its retracted state as shown in FIG. 7a. Thereby, the concertina-like portion 31 of the outer wall 30 is folded together in order to occupy a minimum storing space, but at the same time provides a sufficient volume for enabling the user to provide an amount of powdered or concentrated nutritional formula base 5 within the bottle 3, sufficient to prepare the nutritional formula 5a by injection of liquid into the filter cap 1.

The concertina-like portion 31 of the bottle 3 may then be expanded as shown in FIG. 7b either manually or by the liquid filling the bottle 3 during liquid provision to the filter cap 1.

After the provision of liquid into the bottle 3, the disposable portion 19 is removed from the body portion 17 by pulling the securing latch member 19a.

The teat assembly 14a that is preferably arranged within the filter cap 1 in a retracted state may then be brought into an extended state manually, e.g. by squeezing the bottle 3 (see FIG. 7c).

Instead of a bottle 3 having an expandable and/or retractable portion 31, the system according to the present invention may as well comprise a expendable preform or a flexible, folded pouch that has a rigid rim portion to which the connection means 13 of the filter cap 1 may be connected. Thereby, the preform or pouch may be designed to automatically expand, respectively inflate or unfold during provision of liquid thereto by means of the filter cap 1.

Figure 8A:
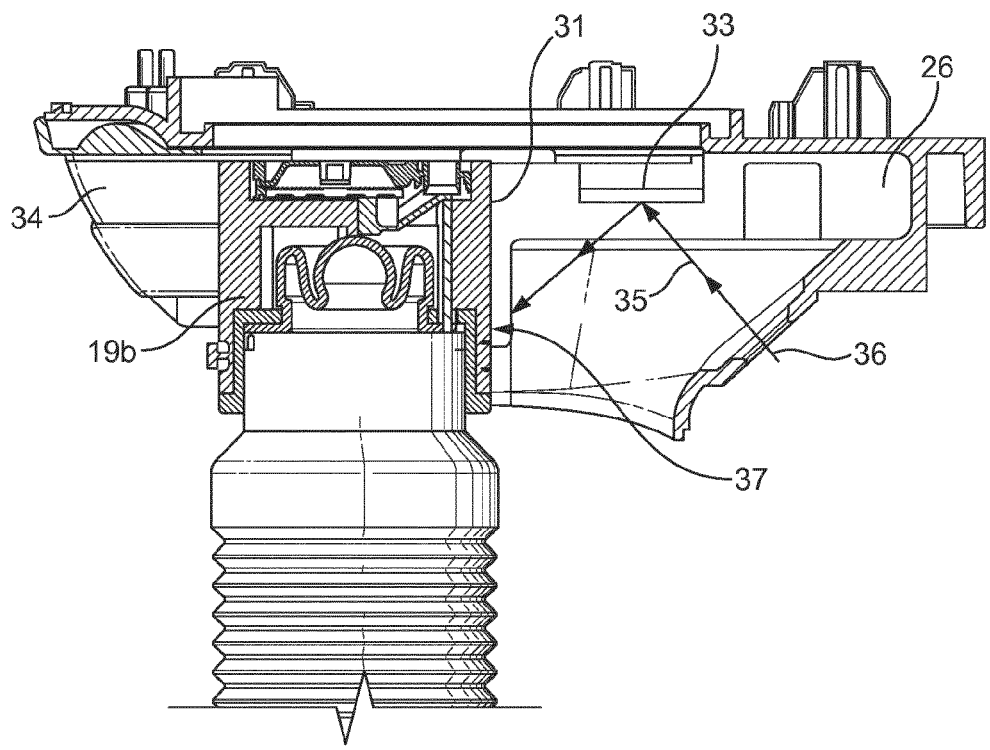
FIG. 8a is a sectional side view of the embodiment according to FIGS. 6a and 6b, wherein the filter cap is connected to a cap connector of the system.
Figure 8B:
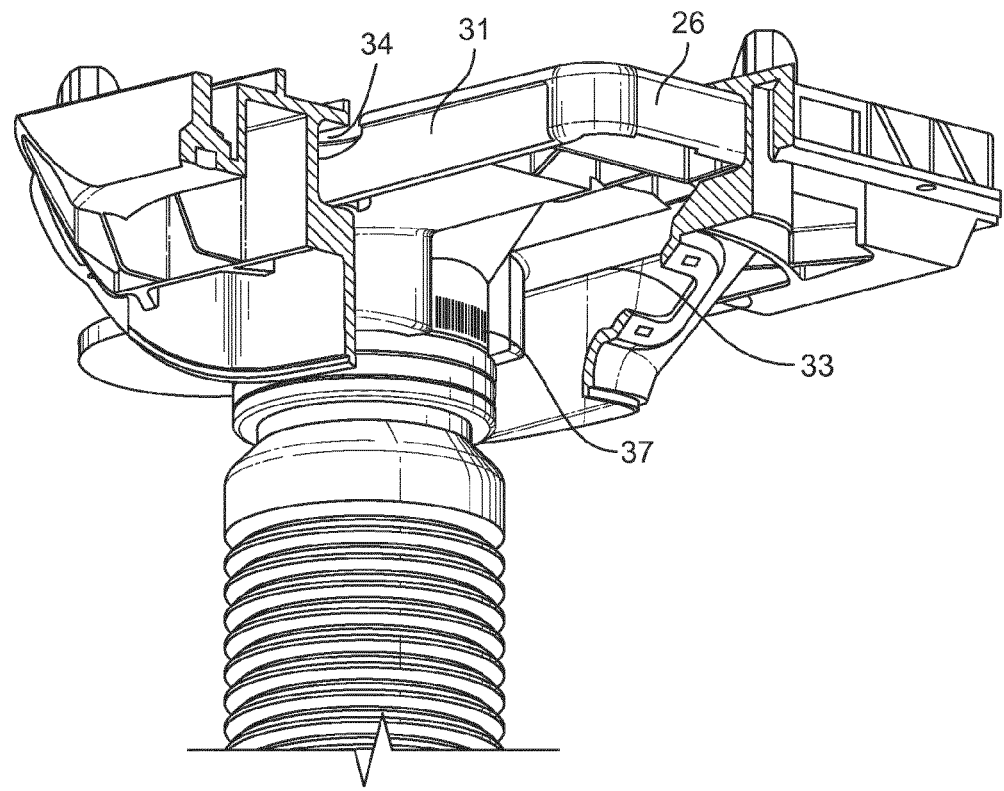
Figure 9A:
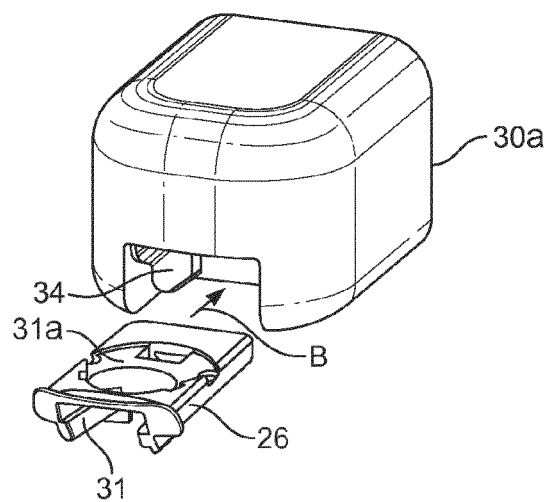
FIG. 9a is a perspective side view of an injection head of water dispensing means and a cap connector.
Figure 9B:
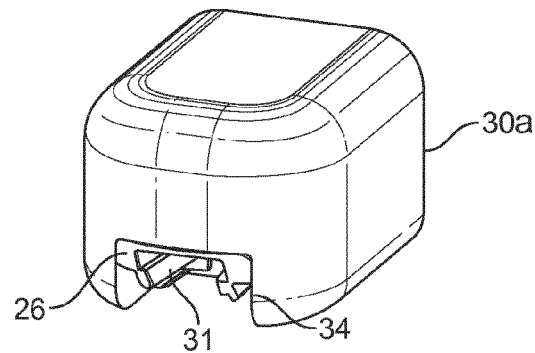
FIG. 9b relates to the embodiment according to FIG. 9a, wherein the cap connector is inserted into the injection head.
Figure 9C:
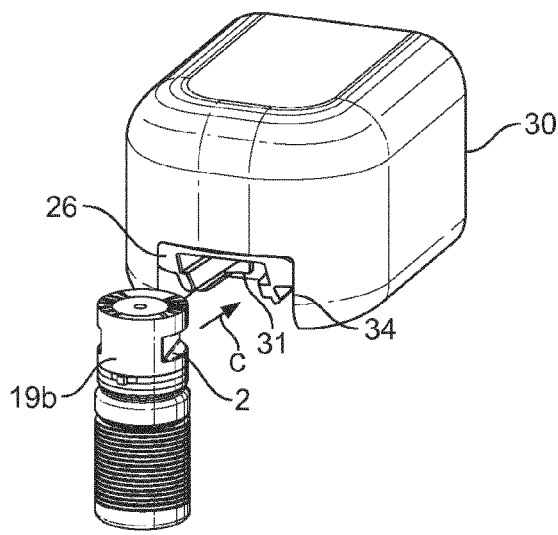
FIG. 9c shows the assembly according to FIG. 7a being inserted into the injection head by means of the cap connector.

FIGS. 8a and 8b show the embodiment of the filter cap 1 according to FIGS. 6a and 6b, wherein the filter cap 1 is connected to a cap connector 26 that is designed for connecting the filter cap 1 to the dispensing means 20 and in particular to a dispensing head 30a of the dispensing means 20 as also shown in FIGS. 9a-9c.

The cap connector 26 preferably comprises a connecting portion 31 that connects to the adaptor 2 provided at a circumferential portion of the filter cap 1. Thereby, the connecting portion 31 may be at least one guiding rail which interacts with the recessed or protruding adaptor 2 of the filter cap 1 (see FIG. 9c, arrow C).

The connecting portion 31 may as well be designed as a snap-fit connection connecting to the adaptor 2 upon insertion of the filter cap 1 and/or turning of the filter cap 1 about a vertical axis thereof.

The cap connector 26 is preferably designed to be selectively connected to a receiving recess 34 of the dispensing head 30a (see FIGS. 9a and 9b, arrow B). Thereby, the cap connector 26 may as well comprise an aperture 31a for holding a cartridge or capsule containing a predefined amount of infant formula base, which is designed to receive the capsule when inserted from above in said aperture 31a (see FIGS. 9a-9c).

The cap connector 26 preferably comprises integrally formed interface means 33 which are arranged to provide a signal transfer from the dispensing means 20, to which the cap connector 26 is intended to be connected, to the filter cap 1 or vice versa. Thereby, the interface means 33 may be any means enabling the transfer of an optical, electrical and/or acoustical signal between the dispensing means Preferably, the interface means 33 is a mirror arranged at the cap connector 26 such as to transfer or redirect a signal 35 from the dispensing means 20 towards an outer portion of the filter cap 1. Thereby, the signal may be e.g. an optical signal 35 from a barcode reader 36 that is transferred by the interface means 33 of the cap connector 26 to a peripheral outer surface 19b of the disposable portion 19 of the filter cap 1 onto which a barcode 37 may be provided.

It is to be understood that by means of the signal transferred from the filter cap 1 to the dispensing means 20 or vice versa, a dedicated control unit (not shown) of the dispensing means 20 may adjust the injection parameters such as the temperature, the flow rate and the amount of the liquid to be injected into the container or bottle 3 connected to the filter cap 1.

Although the present invention has been described with reference to preferred embodiments thereof, many modifi-

The invention claimed is:

1. A filter cap for filtering liquid and dispensing an aqueous nutritional composition to a human, the filter cap comprising:
   a liquid inlet designed to be supplied with liquid from an external liquid dispenser;
   an adaptor for connecting the filter cap to the external liquid dispenser;
   a connector designed to selectively connect an opening of the filter cap to a feeding container designed to hold a powdered or concentrated liquid nutritional formula base for preparation of the aqueous nutritional composition upon hydration with the supplied liquid;
   a filter assembly in a flow path of the liquid from the liquid inlet to the opening, the filter assembly being configured to remove contaminants from the liquid supplied into the feeding container through the liquid inlet; and
   an outlet designed to release gas and/or the liquid from the feeding container connected to the filter cap.

2. The filter cap according to claim 1, further comprising a body portion having a first side to which the filter assembly is connected and a second side in fluid communication with the first side on which the opening is arranged.

3. The filter cap according to claim 1, wherein the filter assembly is designed to be selectively removed from the filter cap.

4. The filter cap according to claim 1, wherein the filter assembly is removably connected to a body portion of the filter cap by a disposable portion fixedly connected to the filter assembly.

5. The filter cap according to claim 4, further comprising a resealable portion arranged in the flow path of the liquid from the liquid inlet to the opening.

6. The filter cap according to claim 5, wherein the resealable portion is designed to interact with the disposable portion to close-off the flow path from the opening to the liquid inlet upon removal of the disposable portion.

7. The filter cap according to claim 1, wherein the liquid inlet and/or outlet of the filter cap comprise sealing members configured to prevent ingress of the contaminants before use, and at least one sealing member is perforable to enable an external liquid probe to supply the liquid into the filter assembly.

8. A filter cap for filtering liquid and dispensing an aqueous nutritional composition to a human, the filter cap comprising:
   a liquid inlet designed to be supplied with liquid from an external liquid dispenser;
   an adaptor for connecting the filter cap to the external liquid dispenser;
   a connector designed to selectively connect an opening of the filter cap to a feeding container designed to hold a powdered or concentrated liquid nutritional formula base for preparation of the aqueous nutritional composition upon hydration with the supplied liquid;
   a filter assembly in a flow path of the liquid from the liquid inlet to the opening, the filter assembly being configured to remove contaminants from the liquid supplied into the feeding container through the liquid inlet; and
   a connection member configured to receive a liquid feeding member.

9. A filter cap for filtering liquid and dispensing an aqueous nutritional composition to a human, the filter cap comprising:
   a liquid inlet designed to be supplied with liquid from an external liquid dispenser;
   an adaptor for connecting the filter cap to the external liquid dispenser;
   a connector designed to selectively connect an opening of the filter cap to a feeding container designed to hold a powdered or concentrated liquid nutritional formula base for preparation of the aqueous nutritional composition upon hydration with the supplied liquid;
   a filter assembly in a flow path of the liquid from the liquid inlet to the opening, the filter assembly being configured to remove contaminants from the liquid supplied into the feeding container through the liquid inlet; and
   an integrally formed teat assembly which is arranged in fluid communication to the opening.

10. A filter cap for filtering liquid and dispensing an aqueous nutritional composition to a human, the filter cap comprising:
    a liquid inlet designed to be supplied with liquid from an external liquid dispenser;
    an adaptor for connecting the filter cap to the external liquid dispenser;
    a connector designed to selectively connect an opening of the filter cap to a feeding container designed to hold a powdered or concentrated liquid nutritional formula base for preparation of the aqueous nutritional composition upon hydration with the supplied liquid;
    a filter assembly in a flow path of the liquid from the liquid inlet to the opening, the filter assembly being configured to remove contaminants from the liquid supplied into the feeding container through the liquid inlet; and
    a gas-liquid equilibrium member to allow gas to leave the feeding container as the liquid is fed through the filter assembly into the feeding container.

11. A filter cap for filtering liquid and dispensing an aqueous nutritional composition to a human, the filter cap comprising:
    a liquid inlet designed to be supplied with liquid from an external liquid dispenser;
    an adaptor for connecting the filter cap to the external liquid dispenser;
    a connector designed to selectively connect an opening of the filter cap to a feeding container designed to hold a powdered or concentrated liquid nutritional formula base for preparation of the aqueous nutritional composition upon hydration with the supplied liquid;
    a filter assembly in a flow path of the liquid from the liquid inlet to the opening, the filter assembly being configured to remove contaminants from the liquid supplied into the feeding container through the liquid inlet; and
    a micro-porous membrane.

12. A beverage production system, comprising a filter cap for filtering liquid and dispensing an aqueous nutritional composition to a human, the filter cap comprising a liquid inlet designed to be supplied with liquid from an external liquid dispenser, an adaptor configured to connect the filter cap to the external liquid dispenser, a connector designed to selectively connect an opening of the filter cap to a feeding container designed to hold a powdered or concentrated liquid nutritional formula base for preparation of the aqueous nutritional composition upon hydration with the supplied liquid, a filter assembly in a flow path of the liquid from the liquid inlet to the opening, the filter assembly being configured to remove contaminants from the liquid supplied into the feeding container through the liquid inlet, and an outlet designed to release gas and/or the liquid from the feeding container connected to the filter cap;

a container or bottle designed to hold the powdered or concentrated liquid nutritional formula base for the preparation of the aqueous nutritional composition upon hydration with the supplied liquid; and the external liquid dispenser having a connection member configured to connect to at least a portion of the filter cap, and an outlet configured to supply the liquid to the liquid inlet of the filter cap.

13. The beverage production system according to claim 12, further comprising a cap connector configured to connect the liquid inlet of the filter cap to the outlet of the external liquid dispenser.

\* \* \* \* \*